(12) United States Patent
Sharma et al.

(10) Patent No.: US 10,353,779 B2
(45) Date of Patent: Jul. 16, 2019

(54) SYSTEMS AND METHODS FOR DETECTION OF FIRMWARE IMAGE CORRUPTION AND INITIATION OF RECOVERY

(71) Applicant: Dell Products L.P., Round Rock, TX (US)

(72) Inventors: Piyush Sharma, Round Rock, TX (US); Eugene David Cho, Austin, TX (US); Kiran George Vetteth, Round Rock, TX (US); Murali K. Somarouthu, Austin, TX (US); Michael Emery Brown, Austin, TX (US); Brian L. Brelsford, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 15/587,737

(22) Filed: May 5, 2017

(65) Prior Publication Data

US 2018/0322012 A1    Nov. 8, 2018

(51) Int. Cl.
 G06F 11/14    (2006.01)
 G06F 9/4401    (2018.01)
 G06F 21/57    (2013.01)
 G06F 11/36    (2006.01)

(52) U.S. Cl.
 CPC ........ G06F 11/1417 (2013.01); G06F 9/4401 (2013.01); G06F 11/1451 (2013.01); G06F 11/1469 (2013.01); G06F 11/3604 (2013.01); G06F 21/572 (2013.01)

(58) Field of Classification Search
 CPC .................................................. G06F 11/1417
 See application file for complete search history.

(56) References Cited

U.S. PATENT DOCUMENTS

| 2005/0144651 | A1* | 6/2005 | Prus ......................... G06F 8/64 |
| | | | 725/134 |
| 2008/0042871 | A1* | 2/2008 | Donaghey ............... G06F 8/654 |
| | | | 340/870.01 |
| 2008/0235501 | A1* | 9/2008 | Bailey ................. G06F 11/1004 |
| | | | 713/1 |

(Continued)

Primary Examiner — Yolanda L Wilson
(74) Attorney, Agent, or Firm — Jackson Walker L.L.P.

(57) ABSTRACT

In accordance with embodiments of the present disclosure, an information handling system may include a host system comprising a host system processor and a device coupled to the host system processor. The information handling system may also include a management controller communicatively coupled to the host system processor and configured to provide management of the information handling system via management traffic communicated between the management controller and a network external to the information handling system and perform runtime verification of a firmware image of the management controller by responsive to each particular read request of the firmware image during runtime of the firmware, verifying integrity of a respective block of the read request and responsive to determining the respective block is corrupted, causing a bootloader of the firmware to, on a subsequent boot of the firmware image, perform recovery of the firmware image.

19 Claims, 3 Drawing Sheets

(56) References Cited

U.S. PATENT DOCUMENTS

| | | | | |
|---|---|---|---|---|
| 2009/0249120 A1* | 10/2009 | Yao | G06F 11/1417 | 714/15 |
| 2010/0077195 A1* | 3/2010 | Altstaedt | G06F 11/1417 | 713/2 |
| 2012/0110379 A1* | 5/2012 | Shao | G06F 11/1417 | 714/15 |
| 2012/0210165 A1* | 8/2012 | Lambert | G06F 11/1417 | 714/15 |
| 2012/0254599 A1* | 10/2012 | Kim | G06F 9/4401 | 713/1 |
| 2013/0007724 A1* | 1/2013 | Lai | G06F 8/654 | 717/173 |
| 2014/0173328 A1* | 6/2014 | Dasari | G06F 11/0793 | 714/2 |
| 2014/0310698 A1* | 10/2014 | Lee | G06F 8/654 | 717/168 |
| 2014/0325644 A1* | 10/2014 | Oberg | G06F 21/57 | 726/22 |

* cited by examiner

SYSTEMS AND METHODS FOR DETECTION OF FIRMWARE IMAGE CORRUPTION AND INITIATION OF RECOVERY

TECHNICAL FIELD

The present disclosure relates in general to information handling systems, and more particularly to methods and systems for detection of firmware image corruption and initiation of recovery.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various components of the an information handling system may include firmware. Firmware is a type of software that provides control, monitoring, and data manipulation of electronic components, such as those used in information handling systems. Like other types of software, firmware is susceptible to corruption.

Currently, typically the only way a user (e.g., administrator) of an information handling system can recover from a firmware corruption is to identify if there was any run time corruption and then initiate a rollback to backup firmware. Such an approach may be ineffective for a number of reasons. First, such approach requires that the user identify that corruption has occurred, which may be challenging in an enterprise comprising numerous information handling systems. Accordingly, an information handling system may indefinitely remain in a corrupted state until the user intervenes. In addition, manual detection of a firmware corruption is often not possible, as the symptoms of corrupted firmware may not be consistent. Thus, the only way a user may discover a firmware corruption is if a system goes unresponsive. Second, such approach requires that a user manually initiate recovery by requesting firmware rollback. Depending on the level of corruption, a user may not even be able to initiate recovery, in which case the user need to initiate a power cycle such that the alternative firmware may will be loaded by a bootloader on the subsequent boot.

SUMMARY

In accordance with the teachings of the present disclosure, the disadvantages and problems associated with existing approaches for detection and recovery of firmware image corruption may be reduced or eliminated.

In accordance with embodiments of the present disclosure, an information handling system may include a host system comprising a host system processor and a device coupled to the host system processor. The information handling system may also include an information handling resource communicatively coupled to the host system processor and configured perform runtime verification of a firmware image of the information handling resource by, responsive to each particular read request of the firmware image during runtime of the firmware, verifying integrity of a respective block of the read request and responsive to determining the respective block is corrupted, causing a bootloader of the firmware to, on a subsequent boot of the firmware image, perform recovery of the firmware image.

In accordance with these and other embodiments of the present disclosure, a method for performing runtime verification of a firmware image may comprise responsive to each particular read request of the firmware image during runtime of the firmware, verifying integrity of a respective block of the read request, and responsive to determining the respective block is corrupted, causing a bootloader of the firmware to, on a subsequent boot of the firmware image, perform recovery of the firmware image.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to perform runtime verification of a firmware image by: (a) responsive to each particular read request of the firmware image during runtime of the firmware, verifying integrity of a respective block of the read request; and (b) responsive to determining the respective block is corrupted, causing a bootloader of the firmware to, on a subsequent boot of the firmware image, perform recovery of the firmware image.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
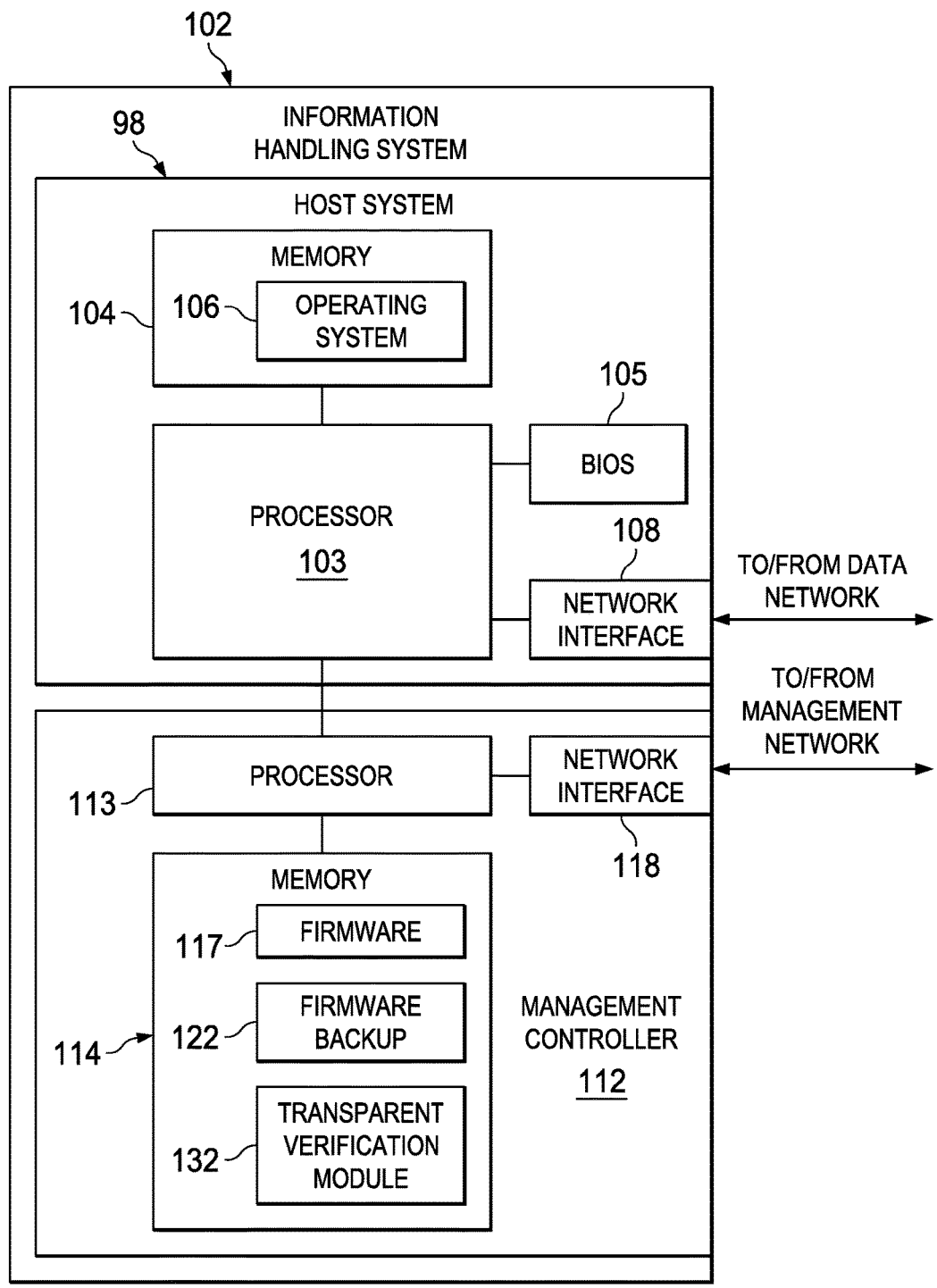
FIG. 1 illustrates a block diagram of an example information handling system, in accordance with embodiments of the present disclosure.
Figure 2:
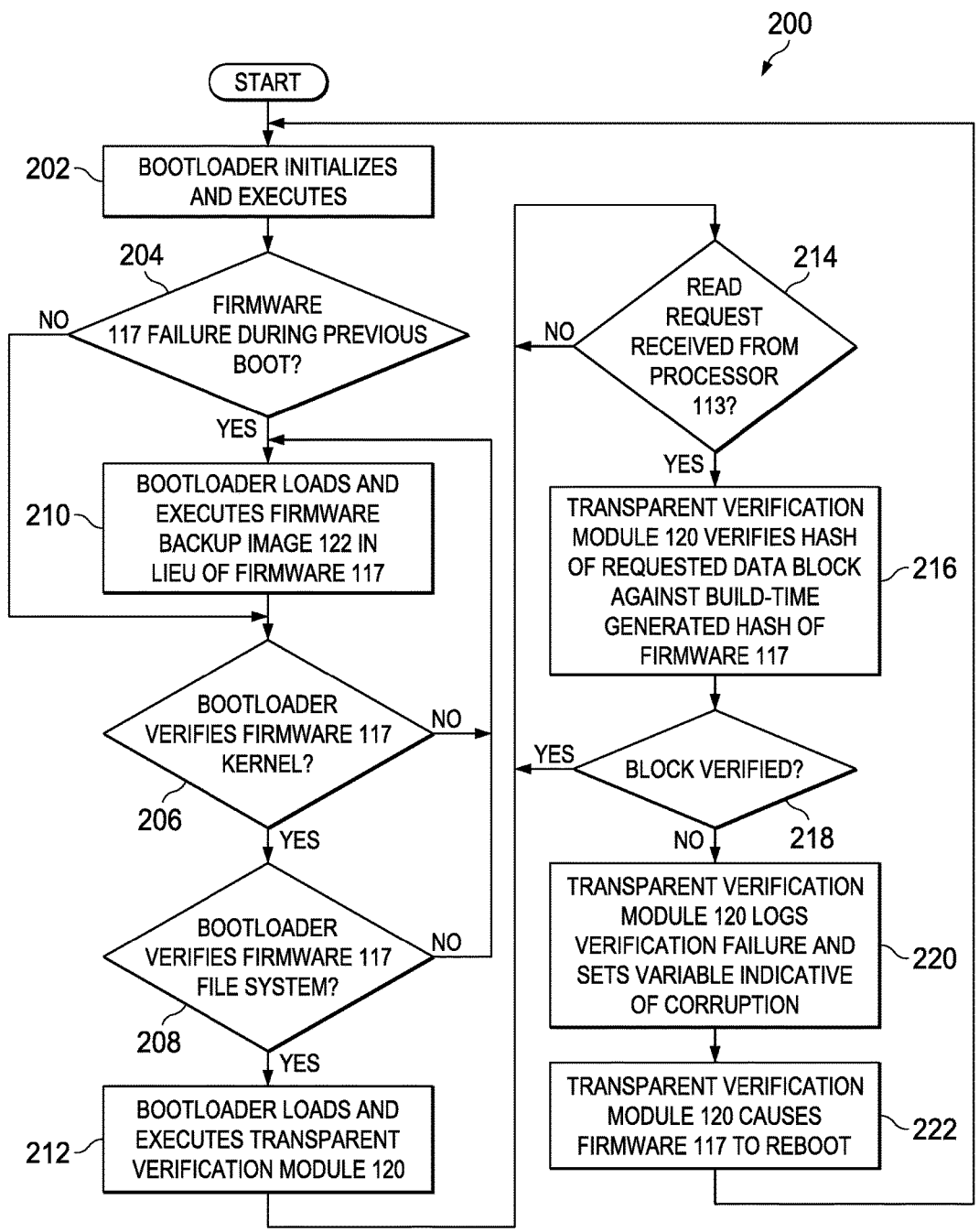
FIG. 2 illustrates a flowchart of an example method for automatic detection of firmware image corruption and initiation of recovery, in accordance with embodiments of the present disclosure.
Figure 3:
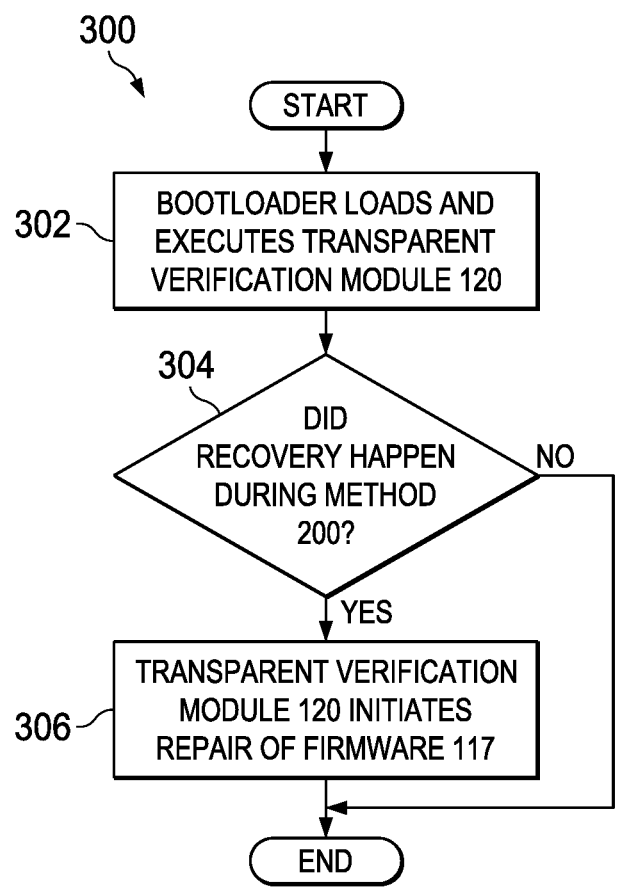
FIG. 3 illustrates a flowchart of an example method for repair of firmware image corruption, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103. In operation, processor 103, memory 104, BIOS 105, and network interface 108 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. In these and other embodiments, processor 103 and network interface 108 may be coupled via any suitable interface, including without limitation a Peripheral Component Interconnect Express (PCIe) bus/interface.

Management controller 112 may be configured to provide management facilities for management of information handling system 102. Such management may be made by management controller 112 even if information handling system 102 is powered off or powered to a standby state. Management controller 112 may include a processor 113, memory 114, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon firmware 117, a firmware backup image 122, a transparent verification module 120. Firmware 117 may comprise any program of executable instructions, or aggregation of programs of executable instructions, configured to, when executed, provide control, monitoring, and/or data manipulation of electronic components of management controller 112 in order to perform the functionality of management controller 112. Although firmware 117 is shown in FIG. 1 as stored in memory 114, in some embodiments firmware 117 may be stored in storage media accessible to processor 113, and active portions of firmware 117 may be transferred from such storage media to memory 114 for execution by processor 113.

Firmware backup image 122 may be a program of executable instructions, or aggregation of programs of executable instructions, that serve as a backup to firmware 117 in the event firmware 117 becomes corrupted. In some embodiments, firmware backup image 122 may be maintained as a copy of firmware 117. In other embodiments, firmware backup image 122 may comprise a "last known good" image that embodies the most recent version of firmware 117 known to have executed without corruption.

Transparent verification module 120 may comprise any program of executable instructions, or aggregation of programs of executable instructions, configured to, when executed, perform automatic detection and recovery of corruption of firmware 117, as described in further detail elsewhere in this disclosure. Although transparent verification module 120 is shown in FIG. 1 as stored in memory 114, in some embodiments transparent verification module 120 may be stored in storage media accessible to processor 113, and active portions of transparent verification module 120 may be transferred from such storage media to memory 114 for execution by processor 113.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

In addition to processor 103, memory 104, network interface 108, and management controller 112, information handling system 102 may include one or more other information handling resources.

FIG. 2 illustrates a flowchart of an example method 200 for automatic detection of firmware image corruption and initiation of recovery, in accordance with embodiments of the present disclosure. According to some embodiments, method 200 may begin at step 202. As noted above, teachings of the present disclosure may be implemented in a variety of configurations of information handling system 102.

At step 202, a bootloader (which may be a part of firmware 117) may, responsive to a boot or other initialization of management controller 112, begin execution. At step 204, the bootloader may read a variable indicative of a previous boot status of firmware 117. Such variable may be stored in a computer-readable medium accessible to processor 113 (e.g., memory 114) and be indicative of whether a run-time failure of firmware 117 was detected during a previous boot of management controller 112. If a run-time failure of firmware 117 was not detected during a previous boot of management controller 112, method 200 may proceed to step 206. Otherwise, if a run-time failure of firmware 117 was detected during a previous boot of management controller 112, method 200 may proceed to step 210.

At step 206, the bootloader may load and verify a kernel of firmware 117. If the bootloader verifies the kernel, method 200 may proceed to step 210. Otherwise, if the bootloader fails verification of the kernel (e.g., due to corruption of the kernel), method 200 may proceed to step 210.

At step 208, the bootloader may initialize and verify a file system for firmware 117. If the bootloader verifies the file system, method 200 may proceed to step 212. Otherwise, if the bootloader fails verification of the kernel (e.g., due to corruption of the kernel), method 200 may proceed to step 210.

At step 210, responsive to detection of a run-time failure of firmware 117 during a previous boot of management controller 112 or a failure in verification of a kernel or the file system of firmware 117, the bootloader may load and execute firmware backup image 122 in lieu of firmware 117, effectively replacing firmware 117 with firmware backup image 122. After completion of step 210, method 200 may proceed again to step 206.

At step 212, the bootloader may load and execute transparent verification module 120. At step 214, transparent verification module 120 may wait for a request by processor 113 for a particular block of firmware 117 for execution during runtime of firmware 117. Upon receipt of such a read request, method 200 may proceed to step 216. At step 216, transparent verification module 120 may, in response to the read request, verify a hash of the requested data block against a build-time generated hash of firmware 117 to verify runtime integrity. At step 218, transparent verification module 120 may determine if the block is verified. If the block is verified, the block may be executed by processor 113, and method 200 may proceed again to step 214. If, on the other hand, transparent verification module 120 determines from the verification that the block is corrupted, method 200 may proceed to step 220.

At step 220, in response to the block being corrupted, transparent verification module 120 may log the verification failure and set a variable (e.g., the variable read in step 204) to indicate the corruption. At step 222, transparent verification module 120 may cause firmware 117 to reboot, effectively restarting method 200 at step 202, and the setting of the variable indicating the corruption may cause the bootloader to load firmware backup image 122 in place of firmware 117 during the reboot.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Accordingly, using the systems and methods described above, transparent verification module 120 performs a cached runtime verification of firmware 117 or portions thereof (e.g., a root file system of firmware 117) to detect any runtime corruption and notify the bootloader to initiate recovery by switching to firmware backup image 122 in the event of corruption. Thus, as opposed to existing approaches in which an entirety of firmware 117 may be verified on every boot, the systems and methods herein may minimize the impact of firmware verification on read performance, and transparent verification module 120 may only verify requested data blocks of firmware 117.

The foregoing discussion contemplates recovery in order to reboot a system to an uncorrupted image. However, in addition to recovery, firmware 117, firmware backup image 122 (when executed), or another component of management controller may perform repair to a corrupted image.

When firmware backup image 122 is executed by the bootloader in response to an error code that indicates that firmware 117 is corrupted, firmware backup image 122 may automatically attempt to repair corrupted portions (e.g., blocks, partitions) in firmware 117. For example, in cases where firmware 117 and firmware backup image 122 are identical copies, firmware backup image 122 may copy blocks from itself to repair firmware 117. As another example, for cases in which firmware 117 and firmware backup image 122 are different, firmware backup image 122 may execute a pre-configured recovery command to fetch a replacement firmware 117 image from some other configured source (e.g., from a network share).

In addition or alternatively, during runtime of firmware 117, a background process may execute that consecutively reads blocks from the image of firmware 117 in the background and compare against a build-time hash to guarantee verified readability. For example, if the image of firmware 117 is 1000 logical blocks long, verification is desired every 30 days, the background process may read 1000/30 blocks per day (approximately 1 block every 43 minutes). If at any point this background process indicates a corruption of firmware 117, the bootloader may boot to backup firmware image 122 and perform recovery as described above.

During runtime of firmware 117, the foregoing actions of the background process as described in previous paragraph may also be performed with respect to firmware backup image 122 as well. If at any point this background process indicates a corruption of firmware backup image 122, recovery of firmware backup image 122 may be performed directly from firmware 117.

FIG. 3 illustrates a flowchart of an example method 300 for repair of firmware image corruption, in accordance with embodiments of the present disclosure. According to some embodiments, method 300 may begin at step 302. As noted above, teachings of the present disclosure may be implemented in a variety of configurations of information handling system 102. Portions of method 300 may be executed before, after or contemporaneously with certain steps of method 200 described above.

At step 302, the bootloader may load and execute transparent verification module 120. Step 302 may occur substantially contemporaneously with step 212 of method 200.

At step 304, transparent verification module 120 may determine if recovery happened during method 200. If recovery occurred, method 300 may proceed to step 306. Otherwise, method 300 may end, At step 306, in response to recovery occurring during execution of method 200, transparent verification module 120 may initiate repair of firmware 117. Such repair may be undertaken in accordance with any of the repair approaches above, or any other suitable manner of performing repair. After completion of step 306, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system comprising:
      a host system processor; and
      a device coupled to the host system processor; and
   an information handling resource communicatively coupled to the host system processor and configured to perform runtime verification of a firmware image of a firmware of the information handling resource by:
      receiving information specifying an amount of time as a desired verification period;
      verifying integrity of respective blocks of the firmware image according to a schedule that is based on a total number of blocks to be verified and further based on the specified amount of time; and
      responsive to determining the respective block is corrupted, causing a bootloader of the firmware to, on a subsequent boot of the firmware image, perform recovery of the firmware image.

2. The information handling system of claim 1, wherein verifying integrity of each respective block comprises comparing the respective block with a build-time hash of the firmware image.

3. The information handling system of claim 1, wherein causing the bootloader of the firmware to perform recovery of the firmware image comprises setting a variable readable by the bootloader to indicate that the firmware image is corrupted.

4. The information handling system of claim 1, wherein the bootloader is configured to perform recovery of the firmware image by loading and executing a firmware backup image in lieu of the firmware image during the subsequent boot.

5. The information handling system of claim 1, wherein the bootloader is further configured to:
   during a boot session, verify integrity of the bootloader; and
   responsive to determining the respective block is corrupted, load and execute a firmware backup image in lieu of the firmware image during the same boot session.

6. The information handling system of claim 1, wherein the bootloader is further configured to:
   during a boot session, verify integrity of a file system of the firmware image; and
   responsive to determining the file system is corrupted, load and execute a firmware backup image in lieu of the firmware image during the same boot session.

7. The information handling system of claim 1, wherein the information handling resource comprises a management controller communicatively coupled to the host system processor and configured to provide management of the information handling system via management traffic communicated between the management controller and a network external to the information handling system.

8. A method for performing runtime verification of a firmware image of a firmware by:
   receiving information specifying an amount of time as a desired verification period;
   verifying integrity of respective blocks of the firmware image according to a schedule that is based on a total number of blocks to be verified and further based on the specified amount of time; and
   responsive to determining the respective block is corrupted, causing a bootloader of the firmware to, on a subsequent boot of the firmware image, perform recovery of the firmware image.

9. The method of claim 8, wherein verifying integrity of each respective block comprises comparing the respective block with a build-time hash of the firmware image.

10. The method of claim 8, wherein causing the bootloader of the firmware to perform recovery of the firmware image comprises setting a variable readable by the bootloader to indicate that the firmware image is corrupted.

11. The method of claim 8, wherein the bootloader performs recovery of the firmware image by loading and executing a firmware backup image in lieu of the firmware image during the subsequent boot.

12. The method of claim 8, wherein the bootloader is further configured to:
   during a boot session, verify integrity of the bootloader; and
   responsive to determining the respective block is corrupted, load and execute a firmware backup image in lieu of the firmware image during the same boot session.

13. The method of claim 8, wherein the bootloader is further configured to:
   during a boot session, verify integrity of a file system of the firmware image; and
   responsive to determining the file system is corrupted, load and execute a firmware backup image in lieu of the firmware image during the same boot session.

14. An article of manufacture comprising:
   a non-transitory computer-readable medium; and
   computer-executable instructions carried on the computer-readable medium, the instructions readable by a processor, the instructions, when read and executed, for causing the processor to perform runtime verification of a firmware image of a firmware by:

receiving information specifying an amount of time as a desired verification period;

verifying integrity of respective blocks of the firmware image according to a schedule that is based on a total number of blocks to be verified and further based on the specified amount of time; and responsive to determining the respective block is corrupted, causing a bootloader of the firmware to, on a subsequent boot of the firmware image, perform recovery of the firmware image.

15. The article of claim 14, wherein verifying integrity of each respective block comprises comparing the respective block with a build-time hash of the firmware image.

16. The article of claim 14, wherein causing the bootloader of the firmware to perform recovery of the firmware image comprises setting a variable readable by the bootloader to indicate that the firmware image is corrupted.

17. The article of claim 14, wherein the bootloader performs recovery of the firmware image by loading and executing a firmware backup image in lieu of the firmware image during the subsequent boot.

18. The article of claim 14, wherein the bootloader is further configured to:

during a boot session, verify integrity of the bootloader; and responsive to determining the respective block is corrupted, load and execute a firmware backup image in lieu of the firmware image during the same boot session.

19. The article of claim 14, wherein the bootloader is further configured to:

during a boot session, verify integrity of a file system of the firmware image; and responsive to determining the file system is corrupted, load and execute a firmware backup image in lieu of the firmware image during the same boot session.

* * * * *